(12) United States Patent
Takahashi (10) Patent No.: US 8,899,132 B2
(45) Date of Patent: Dec. 2, 2014

(54) SPINDLE UNIT, TABLE UNIT, AND MACHINE TOOL

(75) Inventor: Ikuma Takahashi, Kanagawa (JP)

(73) Assignee: Makino Milling Machine Co., Ltd., Tokyo (JP)

(*) Notice: Subject to any disclaimer, the term of this patent is extended or adjusted under 35 U.S.C. 154(b) by 252 days.

(21) Appl. No.: 13/642,707

(22) PCT Filed: Apr. 23, 2010

(86) PCT No.: PCT/JP2010/057732
§ 371 (c)(1),
(2), (4) Date: Feb. 1, 2013

(87) PCT Pub. No.: WO2011/132324
PCT Pub. Date: Oct. 27, 2011

(65) Prior Publication Data
US 2013/0205947 A1    Aug. 15, 2013

(51) Int. Cl.
| | | |
|---|---|---|
| B23Q 1/25 | (2006.01) | |
| B23Q 5/04 | (2006.01) | |
| B23Q 1/54 | (2006.01) | |
| B23Q 1/52 | (2006.01) | |

(52) U.S. Cl.
CPC .............. *B23Q 5/04* (2013.01); *B23Q 1/5406* (2013.01); *B23Q 1/52* (2013.01); *B23Q 2220/006* (2013.01)
USPC .......................... 74/665 A; 409/201; 409/211

(58) Field of Classification Search
USPC ...................... 74/665 A, 665 B; 409/201, 211
See application file for complete search history.

(56) References Cited

U.S. PATENT DOCUMENTS

| | | | | |
|---|---|---|---|---|
| 4,993,138 | A | * | 2/1991 | Yang ............................... 29/560 |
| 5,257,883 | A | * | 11/1993 | Armando ...................... 409/201 |
| 5,584,621 | A | | 12/1996 | Bertsche et al. |
| 5,996,329 | A | * | 12/1999 | Cardenas ................... 29/48.5 R |
| 8,794,883 | B2 | * | 8/2014 | Ou et al. ....................... 409/201 |
| 2002/0077233 | A1 | | 6/2002 | Oldani |
| 2010/0310335 | A1 | * | 12/2010 | Tatsuda et al. ............... 409/204 |

FOREIGN PATENT DOCUMENTS

| | | |
|---|---|---|
| CN | 201102154 Y | 8/2008 |
| CN | 201275694 Y | 7/2009 |
| CN | 101663115 A | 3/2010 |
| EP | 2 075 085 A | 7/2009 |
| EP | 2 113 334 A1 | 11/2009 |
| JP | 61230828 A | 10/1986 |
| JP | 2003048135 A | 2/2003 |
| JP | 2005125414 A | 5/2005 |
| JP | 2005319531 A | 11/2005 |
| JP | 200990439 A | 4/2009 |
| WO | 0051779 A1 | 9/2000 |
| WO | 2008047772 A1 | 4/2008 |

* cited by examiner

*Primary Examiner* — Ha D Ho
(74) *Attorney, Agent, or Firm* — Paul & Paul (57) ABSTRACT

A spindle unit having a tilt shaft for rotating and tilting a spindle head so that a posture of a spindle changes including: the spindle head rotatably supporting the spindle, a tool being attached to a front end of the spindle; a spindle head support having a mutually separated pair of side walls, the spindle head support supporting the spindle head between the pair of side walls in a rotatable and tiltable manner; two power transmission mechanisms provided along the pair of side walls of the spindle head support for transmitting rotational drive power to the tilt shaft; and two drive source devices of the tilt shaft provided between the pair of side walls, the output shafts of the drive source devices being arranged to face the side walls and being connected to the power transmission mechanisms.

10 Claims, 5 Drawing Sheets

SPINDLE UNIT, TABLE UNIT, AND MACHINE TOOL

TECHNICAL FIELD

The present invention relates to a spindle unit which has a tilt shaft for rotating and tilting a spindle head, a table unit which has a tilt shaft for rotating and tilting a table, and a machine tool which is provided with these units.

BACKGROUND ART

In machine tools for cutting workpieces with rotating tools, there is known a machine tool provided with a spindle unit having a tilt shaft for rotating and tilting a spindle to the front end of which a tool is attached, while supporting a spindle head for rotatably driving the spindle by a spindle head support.

Patent Literature 1 describes a machine tool which is provided with the above spindle unit. It discloses, as the drive motors for rotatably driving the tilt shaft, a system which arranges two DD motors (direct drive motors) at the inside of the spindle head support, and connects the motor rotors to the tilt shaft extending from the two side faces of the spindle head without using drive transmission means such as gears to rotatably drive the spindle head. Further, Patent Literature 2 discloses a spindle unit of a type which uses a single motor to transmit rotational drive power to the tilt shaft by two systems.

However, with the configuration in the drive system of a tilt shaft according to the above prior art, there is a problem that a great deal of time is required for replacing a motor. The reason is that, since the configuration of the drive part becomes complicated, a large number of parts have to be detached when changing a motor, and naturally much time is required for assembly.

There is a similar problem in a table unit having a tilt shaft which rotates and tilts a table base for supporting a table to which a workpiece is attached.

CITATIONS LIST

Patent Literature 1:
U.S. Pat. No. 5,584,621
Patent Literature 2:
Japanese Unexamined Patent Publication No. 2009-90439

SUMMARY OF INVENTION

The object of the present invention is to provide a spindle unit and table unit which enable easy replacement of a tilt shaft drive motor for rotating and tilting a spindle head or table base, and a machine tool provided with these units.

According to one aspect of the present invention, there is provided a spindle unit having a tilt shaft for rotating and tilting a spindle head so that a posture of a spindle changes, the spindle unit including the spindle head rotatably supporting the spindle, a tool being attached to a front end of the spindle, a spindle head support having mutually separated first and second side walls, the spindle head support supporting the spindle head between the first and second side walls in a rotatable and tiltable manner, first and second power transmission mechanisms provided along the first and second side walls of the spindle head support, respectively, the first and second power transmission mechanisms transmitting rotational drive power to the tilt shaft, and first and second drive source devices provided between the first and second side walls of the spindle head support, respectively, the first and second drive source devices outputting rotational drive power of the tilt shaft, wherein an output shaft of the first drive source device being arranged to face the first side wall and being connected to the first power transmission mechanism, wherein an output shaft of the second drive source device being arranged to face the second side wall and being connected to the second power transmission mechanism, and wherein the first and second drive source devices being arranged in parallel with the output shafts of the first and second drive source devices offset from each other.

According to another aspect of the present invention, there is further provided a spindle unit wherein the first and second power transmission mechanisms are arranged rotationally symmetric with each other at positions along the first and second side walls of the spindle head support.

According to another aspect of the present invention, there is further provided a spindle unit wherein the first and second power transmission mechanisms have taper gears attached to the output shafts of the first and second drive power devices so that smaller outside diameters are arranged in front end sides, respectively, wherein the second side wall of the spindle head support which a back end surface of the first drive source device faces has a hole of a size capable of passing the first drive source device in a state with the taper gear attached, and wherein the first side wall of the spindle head support which a back end surface of the second drive source device faces has a hole of a size capable of passing the second drive source device in a state with the taper gear attached.

According to another aspect of the present invention, there is further provided a spindle unit which is further provided with a swivel shaft differing from the tilt shaft, the swivel shaft swiveling the spindle head support.

According to another aspect of the present invention, there is further provided a machine tool including a spindle unit wherein the spindle unit is provided movably by at least one linear feed shaft in the vertical direction and horizontal direction.

According to another aspect of the present invention, there is provided a table unit having a tilt shaft for rotating and tilting a table so that a posture of the table changes, the table unit including a table base supporting the table to which a workpiece is attached, a table base support having mutually separated first and second side walls, the table base support supporting the table base between the first and second side walls in a rotatable and tiltable manner, first and second power transmission mechanisms provided along the first and second side walls of the table base support, respectively, the first and second power transmission mechanisms transmitting rotational drive power to the tilt shaft, and first and second drive source devices provided between the first and second side walls of the table base support, respectively, the first and second drive source devices outputting rotational drive power of the tilt shaft, wherein an output shaft of the first drive source device being arranged to face the first side wall and being connected to the first power transmission mechanism, wherein an output shaft of the second drive source device being arranged to face the second side wall and being connected to the second power transmission mechanism, and wherein the first and second drive source devices being arranged in parallel with the output shafts of the first and second drive source devices offset from each other.

According to another aspect of the present invention, there is further provided a table unit wherein the first and second power transmission mechanisms are arranged rotationally symmetric with each other at positions along the first and second side walls of the table base support.

According to another aspect of the present invention, there is further provided a table unit wherein the first and second power transmission mechanisms have taper gears attached to the output shafts of the first and second drive power devices so that smaller outside diameters are arranged in front end sides, respectively, wherein the second side wall of the table base support which a back end surface of the first drive source device faces has a hole of a size capable of passing the first drive source device in a state with the taper gear attached, and wherein the first side wall of the table base support which a back end surface of the second drive source device faces has a hole of a size capable of passing the second drive source device in a state with the taper gear attached.

According to another aspect of the present invention, there is further provided a table unit which is further provided with a swivel shaft differing from the tilt shaft, the swivel shaft swiveling the table base support.

According to another aspect of the present invention, there is further provided a table unit which is further provided with a swivel shaft, differing from the tilt shaft, the swivel shaft swiveling the table with respect to the table base.

DESCRIPTION OF EMBODIMENTS

Hereinafter, referring to FIGS. 1 to 5, embodiments of a spindle unit and a table unit and a machine tool according to the present invention will be explained.

Figure 1:
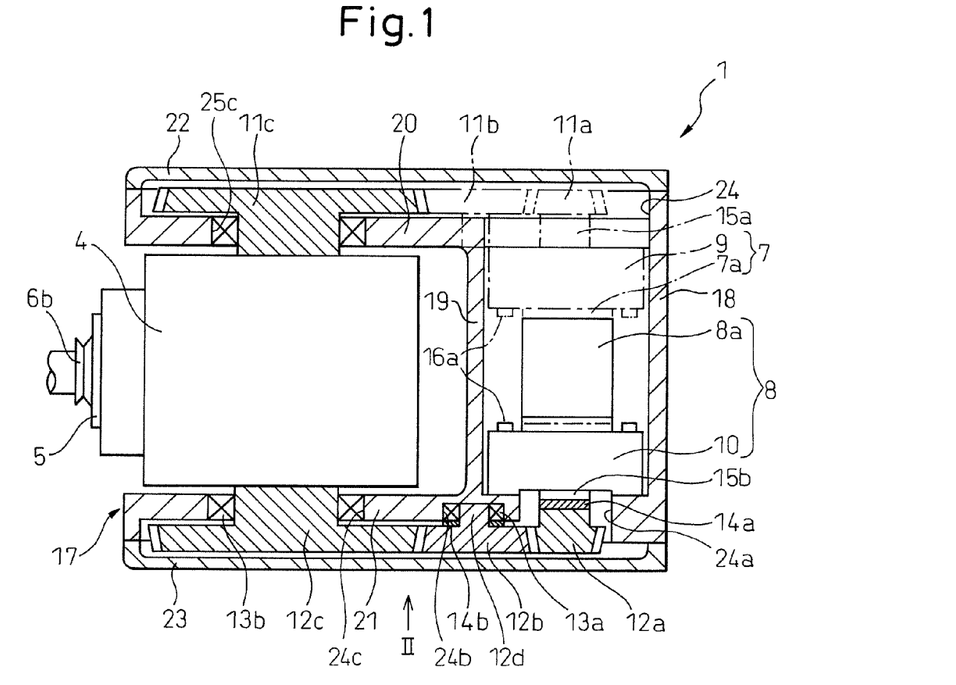
FIG. 1 is a cross-sectional view showing one embodiment of a spindle unit according to the present invention and a cutaway view along I-I of FIG. 2.
Figure 2:
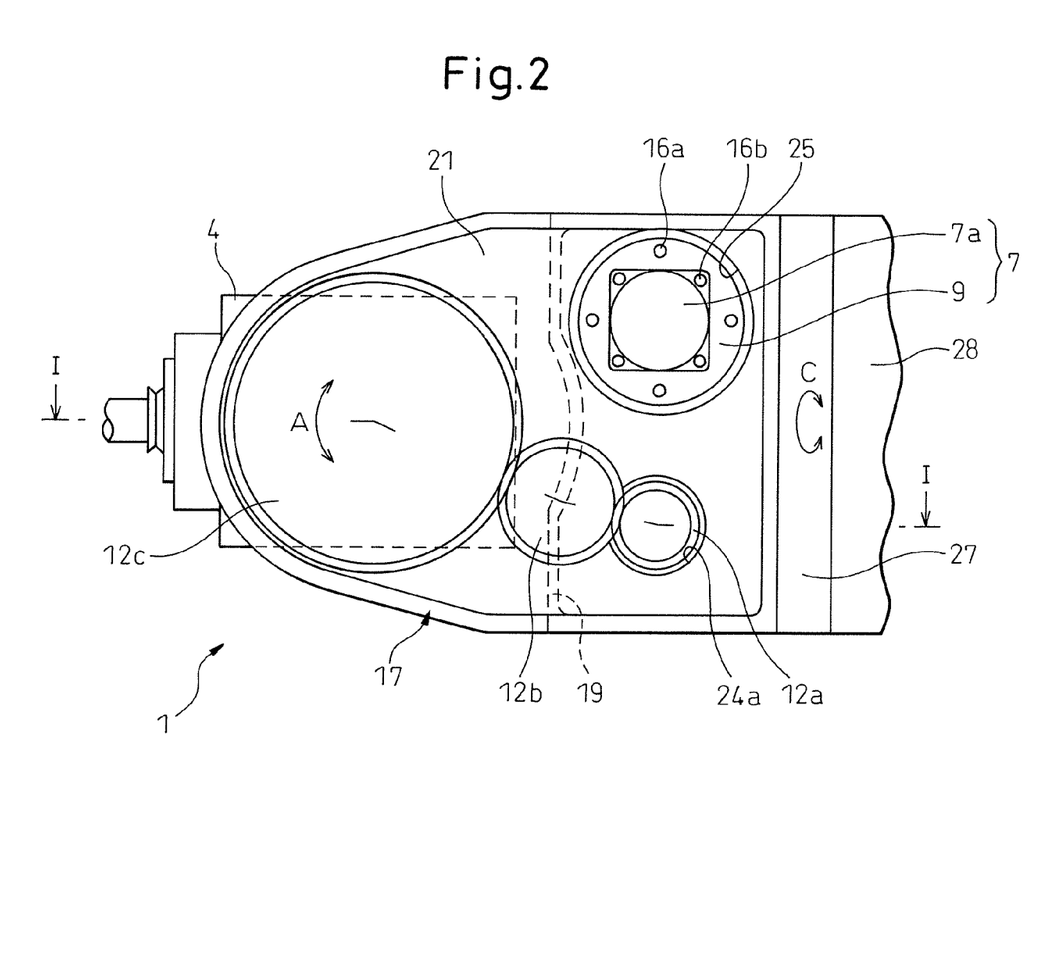
FIG. 2 is a schematic view showing one embodiment of a spindle unit according to the present invention and a view seen along the arrow mark from the II direction after removing a second cover 23 of FIG. 1.
Figure 3:
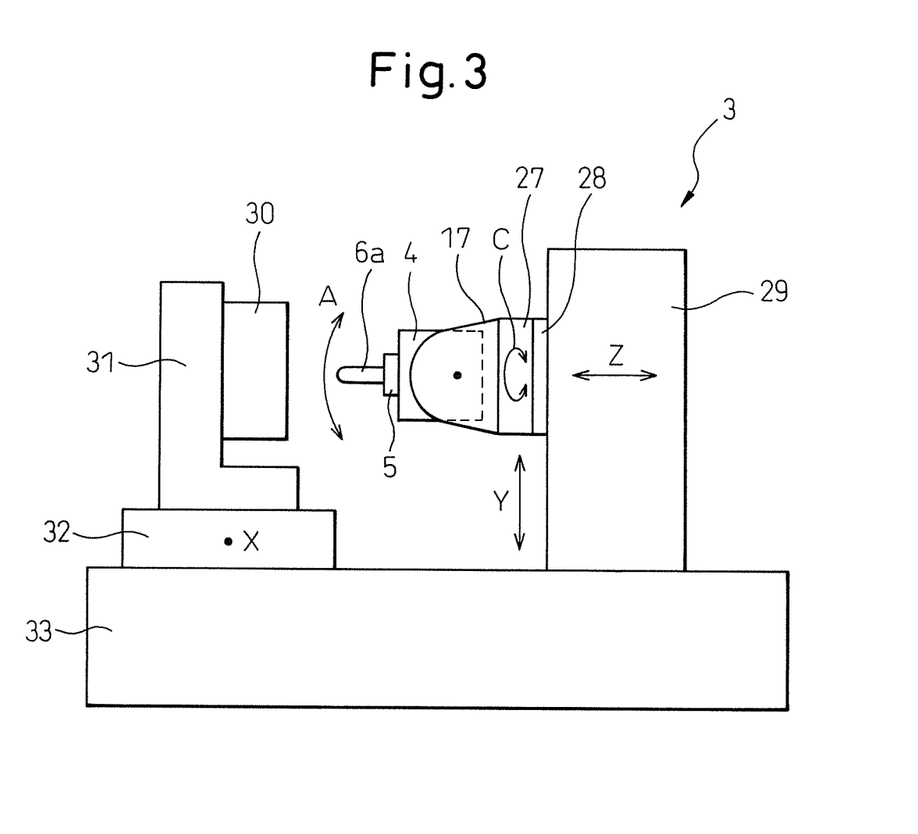
FIG. 3 is a schematic view showing one embodiment of a machine tool which is provided with a spindle unit according to the present invention.

FIG. 1 is a cross-sectional view which shows one embodiment of a spindle unit 1 according to the present invention, while FIG. 2 is a schematic view which shows the present embodiment. FIG. 1 shows a cutaway view along I-I of FIG. 2, while FIG. 2 is view seen along the arrow mark from the II direction after removing a second cover 23 of FIG. 1. FIG. 3 shows one embodiment of a machine tool 3 which is provided with a spindle unit 1 of the present invention.

First, the configuration of one embodiment of the machine tool 3 which is provided with the spindle unit 1 of the present invention will be explained with reference to FIG. 3.

The machine tool 3 shown in FIG. 3 is a spindle head tilting and swiveling type 5-axis control machine tool. A column 29 is provided on a bed 33 movable horizontally in the Z-axis (left-right) direction. At the column 29, a spindle head 4 is supported through a spindle base 28, a swivel base 27, and a spindle head support 17 movable vertically in the Y-axis (up-down) direction. A tool 6a is attached to a front end of a spindle 5 rotatably supported at the spindle head 4 in the horizontal direction. Here, all of the parts from the spindle base 28 to the spindle 5 will be referred to as the "spindle unit 1".

On the bed 33, further, a table 32 is supported in a manner movable horizontally in the X-axis direction (direction vertical to paper surface). On the table 32, a workpiece 30 is attached through an angle rest 31. Due to this configuration, the tool 6a attached to the spindle 5 and the workpiece 30 attached on the table 32 move relative to each other in the X-axis, Y-axis, and Z-axis directions.

In the field of machine tools, the control axis in the rotational direction where the spindle head 4 tilts with respect to the spindle head support 17 about the horizontal axis parallel to the X-axis is referred to as the "A-axis", while the control axis in the rotational direction where the spindle head support 17 swivels with respect to the spindle base 28 about the horizontal axis parallel to the Z-axis is referred to as the "C-axis". The 5-axis control machine tool 3 of the present embodiment is provided with not only linear movement mechanisms in which the spindle head 4 moves relative to the workpiece 30 in the X-axis, Y-axis, and Z-axis directions, but also a tilt-and-rotate mechanism of the A-axis direction and a swivel mechanism of the C-axis direction. While not present in the present embodiment, the control axis in the rotational direction of tilt about the horizontal axis parallel to the Y-axis is referred to as the "B axis".

There is also a type of a 5-axis control machine tool where the spindle head, which mounts a spindle to a gate-shaped frame facing downward, tilts about the horizontal axis and where the spindle head support swivels about the vertical axis. The spindle unit of the present invention also can be applied to this.

The present invention further applies for a 4-axis control machine tool which has an X-axis, Y-axis, Z-axis, and A-axis and B-axis, without having C-axis.

Next, a first embodiment of the present invention in a spindle unit 1 which is attached to a column 29 of the above such machine tool 3 will be explained with reference to FIG. 1 and FIG. 2.

As shown in FIG. 1, a spindle 5 to which a tool holder 6b is attached is supported at a spindle head 4 rotatably around the center axis by a bearing which is not shown. The spindle head 4 is arranged between a pair of mutually separated side walls 20, 21 of a spindle head support 17, and is attached to the side walls 20, 21 in a manner rotatable and tiltable about two support shafts extending from the side surfaces of the spindle head 4 in the up-down direction in FIG. 1 and in the vertical direction to the paper surface in FIG. 2, i.e., rotatable in the A-axis (tilt shaft) direction of FIG. 2. Hereinafter, the drive source devices 7, 8 and the power transmission mechanisms of the rotate and tilt operations of this spindle head 4 will be explained.

In the spindle head support 17, the front end direction of the spindle 5 will be explained as the "front", and the opposite direction will be explained as the "back". As shown in FIG. 1, the spindle head support 17 is provided with an intermediate wall 19 behind the spindle head 4. A space is formed with the intermediate wall 19 and the back wall 18. The first motor 7a and the second motor 8a are placed inside this space, and are connected to a first reduction gear 9 and a second reduction gear 10, respectively. Hereinafter, the first motor 7a and the first reduction gear 9 will be referred to as the "first drive source device 7", and the second motor 8a and the second reduction gear 10 will be referred to as the "second drive source device 8".

The first drive source device 7 and the second drive source device 8 are provided at positions rotationally symmetric by 180° with respect to each other. This means that in FIG. 2, if making the swivel base 27 rotate in the C-axis direction to make the spindle head support 17 rotate by 180°, the first drive source device 7 becomes placed at the original position of the second drive source device 8, and the second drive source device 8 becomes placed at the original position of the first drive source device 7.

In the present embodiment, although the first and second drive source devices 7, 8 are provided at positions rotationally symmetric by 180°, the invention is not limited to this and the first and second drive source devices 7, 8 may also be arranged in parallel with output shafts 15a, 15b offset from each other. Here, "parallel" does not mean "parallel" in the strict sense. Further, in this case, it is required that the distance between the center axes of the output shafts 15a, 15b is an extent not causing a problem for the later explained attachment or detachment of the first and second drive source devices 7, 8.

As shown in FIG. 1, the first drive source device 7 and the second drive source device 8 are provided between the side walls 20 and 21 in opposite directions with each other so that the output shafts 15a, 15b face the directions of the side walls 20, 21. The later explained taper gears are attached to the front ends of respective output shafts 15a, 15b and are connected to the taper gear trains which are power transmission mechanisms. The side walls 20, 21 are provided with holes 24, 25 of sizes through which the second drive source device 8 and the first drive source device 7 can pass when placing them in the above space.

FIG. 1 shows a cross-sectional view along I-I of FIG. 2 regarding the drive mechanism for the rotate and tilt operation of the spindle head 4. Therefore, the second drive source device 8 which is attached to the second side wall 21 visible at the front of the paper of FIG. 2, i.e., the second motor 8a and the second reduction gear 10, is shown by the solid lines in FIG. 1. Hereinafter, the power transmission mechanism from the output shaft 15b to the spindle head 4 of the second drive source device 8 shown in FIG. 1 will be explained.

The output shaft 15b is provided with a second drive gear 12a at the front end part. The second drive gear 12a is formed so that the addendum shape becomes a taper shape where the diameter of the addendum circle decreases toward the front end direction of the output shaft 15a as illustrated. A second intermediate gear 12b meshing with the second drive gear 12a is formed so that the addendum shape becomes a taper shape where the diameter of the addendum circle increases toward the outside in contrast to the second drive gear 12a. Further, a second tilt shaft gear 12c meshing with the second intermediate gear 12b, which is provided at the front end of a support shaft extending from the spindle head 4, is formed into a taper shape where the diameter of the addendum circle decreases toward the front end of the shaft in a opposite direction to the second intermediate gear 12b and in the same direction as the second drive gear 12a. The backlash between these gears is adjusted and eliminated by adjusting the thicknesses of adjustment washers 14a, 14b to move the gears in the axial direction. The shaft 12d of the second intermediate gear 12b and the support shaft of the spindle head 4 are supported at the second side wall 21 by bearings 13a, 13b provided at respective holes 24b, 24c.

By making the above taper gear train, the backlash can be easily adjusted by the above adjustment washers. Further, the taper shape of the second drive gear 12a is made the above orientation so as to enable attachment and detachment of the second drive source device 8 in the state with the second drive gear 12a attached to the output shaft 15b. In a configuration where no adjustment of backlash is required, it is also possible to use spur gears instead of taper gears.

The above explained spindle unit 1 may further, as shown in FIG. 1 and FIG. 3, be provided with a swivel shaft (C-axis) different from the above tilt shaft (A-axis) for tilting the spindle head support 17 attached to the swivel base 27, for example, by a device enabling the swivel base 27 to swivel with respect to the spindle base 28. It is also possible to provide. Further, although the present embodiment uses gear devices as power transmission mechanisms, for example it is also possible to use timing belts or other power transmission mechanisms.

Next, the procedure for replacement of the first motor 7a will be explained with reference to FIG. 1 and FIG. 2.

The first motor 7a which is shown in FIG. 2 is attached by bolts 16b to the first reduction gear 9 with the output shaft 15a facing the first side wall 20 at the depth side of the paper surface. A tool is inserted from the hole 25 which is provided in the second side wall 21 to remove the mounting bolts 16b and remove the first motor 7a from the first reduction gear 9, and then the first motor 7a is pulled out from the hole 25. Further, the replacement first motor 7a is inserted from the hole 25 and attached to the first reduction gear 9 by the mounting bolts 16b so as to replace the first motor 7a. It is also possible to replace the first drive source device 7 together with the first reduction gear 9 to which the first motor 7a is attached by the mounting bolts 16a.

Regarding the second motor 8a as well, it is possible to insert a tool from the hole 24 which is provided in the first side wall 20 so as to remove the mounting bolts 16b and remove the second reduction gear 10 and replace the motor by exactly the same procedure. Further, it is also possible to replace the second drive source device 8 together with the second reduction gear 10.

In this way, in the present embodiment, it is possible to replace the tilt shaft drive motor by extremely simple work in a short time. At this time, as shown in FIG. 3, in the machine tool of the present invention, if the spindle unit 1 is movably provided by at least one linear feed shaft in the up-down direction (Y-axis) and horizontal direction (Z-axis), when replacing a drive source device, it is possible to move the Y-axis lower and move the Z-axis to the right so as to enable work at a low position and wider location. Of course, the machine tool may also be configured so that the spindle unit 1 can be moved in the three X-, Y-, and Z-axis directions.

Further, if the spindle unit 1 has a swivel shaft (C-axis), when carrying out replacement work of a drive source device, the spindle head support can be rotated and positioned in a direction facilitating work. For example, it is possible to use a crane to safety and quickly carry out the work of lifting up the drive source device.

In a conventional machine, since replacement of the tilt drive motor of the spindle head required removal of a lot of parts, a long time was required for the work. In the spindle unit 1 of the present embodiment, by the above configuration which makes effective use of the space at the inside of the spindle head support 17, the maximum radius of the swivel shaft is reduced. Further, by enabling direct detachment and attachment of only the drive source devices from the holes provided in the side walls, easy replacement of the drive source devices is also realized.

Next, the configuration of the table unit 2 of a second embodiment of the present invention will be explained.

The second embodiment applies a system similar to the rotate and tilt drive system of the spindle head of the first embodiment explained above to a rotate and tilt drive system of a table. The spindle head and table are in a relationship of relative motion with each other. Therefore, instead of rotating and tilting the spindle head, it is also possible to fasten the spindle head and rotate and tilt so as to make the two carry out a similar operation relative to each other. Note that the reference signs are shown with an apostrophes appended to the same reference signs for parts which correspond to the first embodiment.

Figure 4:
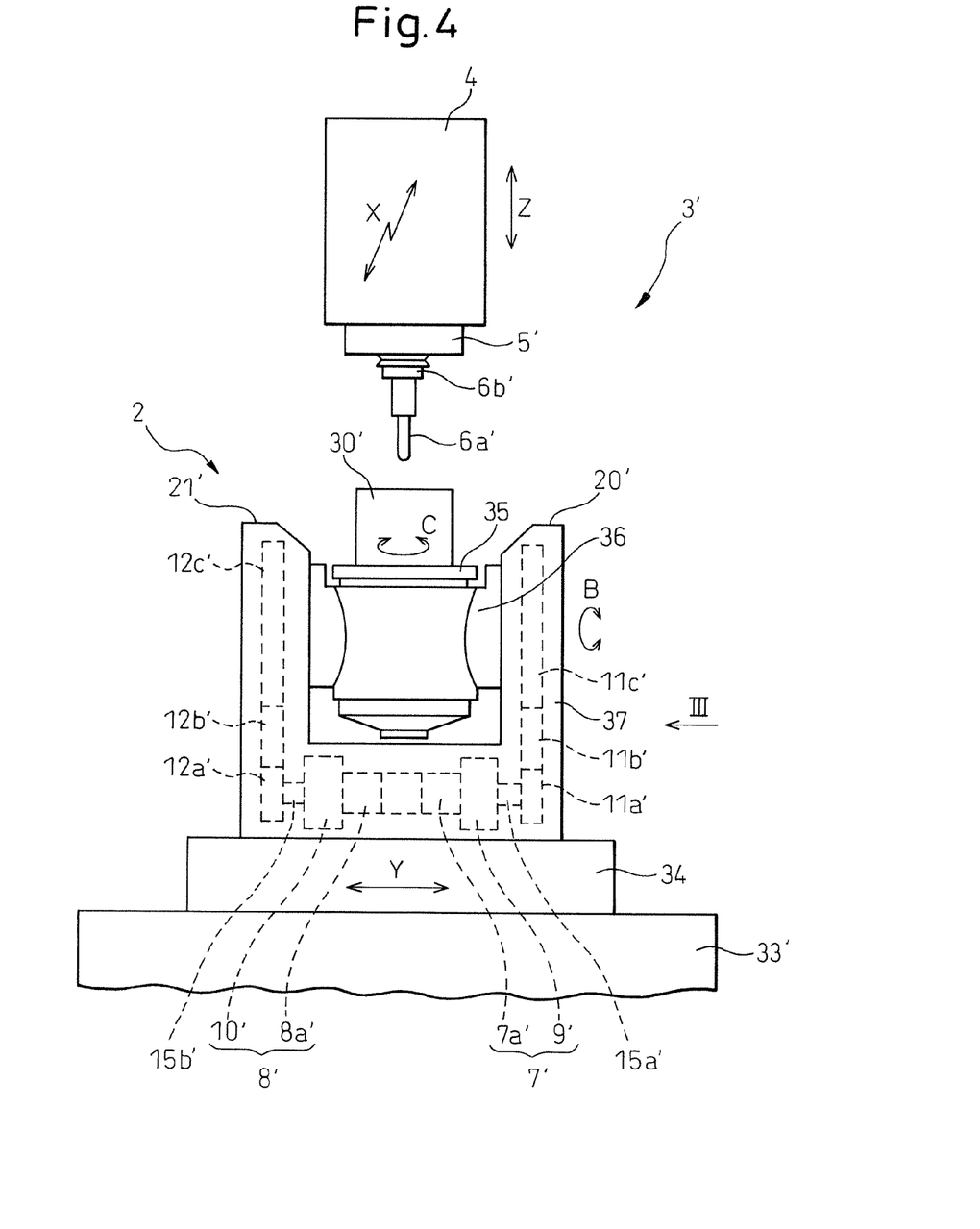
FIG. 4 is a schematic view showing one embodiment of a table unit according to the present invention.
Figure 5:
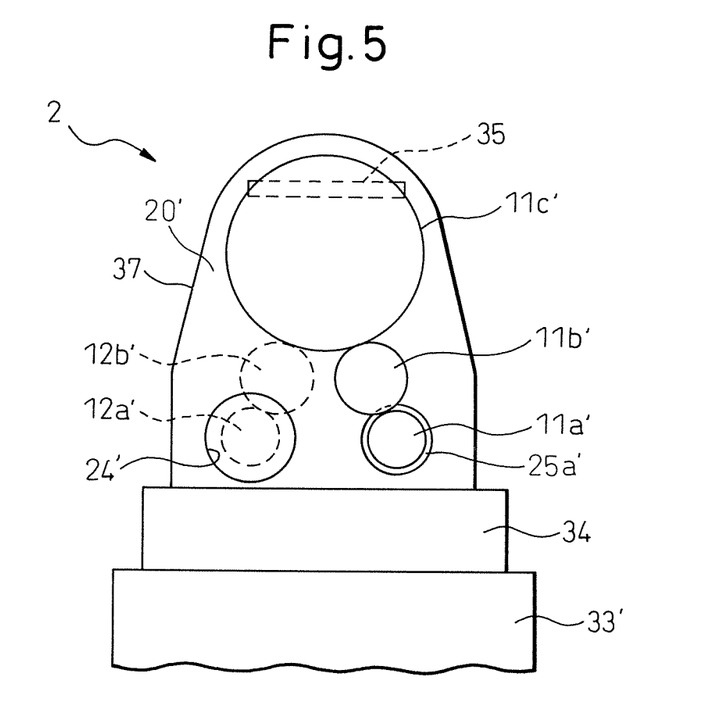
FIG. 5 is a schematic view showing one embodiment of a table unit according to the present invention and a view seen along the arrow mark from the III direction after removing a cover of a support 37 of FIG. 4.

As shown in FIGS. 4 and 5, the table 35 which carries and fastens the workpiece 30' is set on a table base 36 housing the drive mechanism of the table 35. The table base 36 is arranged between a pair of mutually separated side walls 20', 21' of a support 37 which is the table base support, and is attached to the side walls 20', 21' so as to be rotatable and tiltable about the two support shafts which extend from the side walls of the table base 36 in the left-right direction in FIG. 4, i.e., rotatably in the B-axis (tilt shaft) direction of FIG. 4. Here, all of the parts from the support 37 to the table 35 will be referred to as the "table unit 2". Hereinafter, the two drive source devices 7', 8' and power transmission mechanisms of the rotate and tilt operation of the table base 36 will be explained.

The configuration of the drive source devices 7', 8' and the power transmission mechanisms is similar to those at the spindle head support 17 of the first embodiment.

More specifically, in the bottom space between the pair of side walls 20', 21' of the support 37, a first motor 7a' and a second motor 8a' are placed and connected to a first reduction gear 9' and a second reduction gear 10', respectively. Hereinafter, the first motor 7a' and the first reduction gear 9' will be referred to as the "first drive source device 7'", while the second motor 8a' and the second reduction gear 10' will be referred to as the "second drive source device 8'".

The first drive source device 7' and the second drive source device 8' are attached rotationally symmetric from each other by 180° at the support 37. The output shafts of the motors 7' and 8' are coupled through the reduction gears 9', 10' to the drive gears 11a', 12a', respectively. These gears engage with tilt shaft gears 11c', 12c' which are attached to the front ends of the above two support shafts through the intermediate gears 11b', 12b'. The gears are taper gears. The point of moving the backlash by washers in the axial direction for adjustment is similar to the first embodiment, so a detailed explanation will be omitted. In a configuration where no adjustment of backlash is required, it is also possible to use spur gears instead of taper gears.

In the present embodiment, although the first and second drive source devices 7', 8' are provided at positions rotationally symmetric by 180° as explained above, the invention is not limited to this. It is also possible to arrange the first and second drive source devices 7' and 8' in parallel with output shafts 15a', 15b' offset from each other.

The above explained table unit 2 may further, as shown in FIG. 4, be provided with a swivel shaft (C-axis) different from the above tilt shaft (B-axis) for swiveling the table 35 with respect to the table base 36, for example, by a swivel drive mechanism of the table 35 built in the table base 36. Further, although the present embodiment uses gear devices as power transmission mechanisms, it is also possible to use, for example, timing belts or other power transmission mechanisms.

According to the above configuration, the table unit 2 of the present embodiment becomes similar to the first embodiment in the procedure for replacement of the first motor 7a' and the second motor 8a'. For example, the second motor 8a' can be easily replaced from the hole 24' of FIG. 5 in a short time. Further, the tilt shaft drive motor and power transmission mechanism can be arranged compactly in the space inside of the support 37, so space can be saved.

FIG. 4 schematically shows one embodiment of a machine tool 3' which is provided with a table unit 2 of the present invention. The support 37 is placed on a movement table 34 which can move on the bed 33' horizontally in the Y-direction. The machine tool 3' is provide with the above table unit 2 and further is provided with a spindle head 4 which can move in the Z-axis and X-axis directions. It may be also possible to constitute such that the swivel drive mechanism of the table 35 is not built in the table base 36, but is fastened to the table base 36 and provide the movement table 34 with a mechanism for swiveling the entire support 37 in the C-axis direction.

REFERENCE SIGNS LIST 4 spindle head
5, 5' spindle
6a, 6a' tool
7, 7' first drive source device
8, 8' second drive source device
11a, 11a' first drive gear
11b, 11b' first intermediate gear
11c, 11c' first tilt shaft gear
12a, 12a' second drive gear
12b, 12b' second intermediate gear
12c, 12c' second tilt shaft gear
15a output shaft
15b output shaft
16a bolt
16b bolt
17 spindle head support
20, 20' first side wall
21, 21' second side wall
24, 24 hole
25 hole
27 swivel base
28 spindle table
29 column
30, 30' workpiece
32 table
33, 33' head
34 movement table
35 table
36 table base
37 support

The invention claimed is:

1. A spindle unit having a tilt shaft for rotating and tilting a spindle head so that a posture of a spindle changes,
the spindle unit comprising:
the spindle head rotatably supporting the spindle, a tool being attached to a front end of the spindle;
a spindle head support having mutually separated first and second side walls, the spindle head support supporting the spindle head between the first and second side walls in a rotatable and tiltable manner;
first and second power transmission mechanisms provided along the first and second side walls of the spindle head support, respectively, the first and second power transmission mechanisms transmitting rotational drive power to the tilt shaft; and
first and second drive source devices provided between the first and second side walls of the spindle head support, respectively, the first and second drive source devices outputting rotational drive power of the tilt shaft,
wherein an output shaft of the first drive source device being arranged to face the first side wall and being connected to the first power transmission mechanism, wherein an output shaft of the second drive source device being arranged to face the second side wall and being connected to the second power transmission mechanism, and wherein the first and second drive source devices being arranged in parallel with the output shafts of the first and second drive source devices offset from each other.

2. The spindle unit according to claim 1, wherein the first and second power transmission mechanisms are arranged rotationally symmetric with each other at positions along the first and second side walls of the spindle head support.

3. The spindle unit according to claim 1, wherein the first and second power transmission mechanisms have taper gears attached to the output shafts of the first and second drive power devices so that smaller outside diameters are arranged in front end sides, respectively, wherein the second side wall of the spindle head support which a back end surface of the first drive source device faces has a hole of a size capable of passing the first drive source device in a state with the taper gear attached, and wherein the first side wall of the spindle head support which a back end surface of the second drive source device faces has a hole of a size capable of passing the second drive source device in a state with the taper gear attached.

4. The spindle unit according to claim 1, further comprising a swivel shaft differing from the tilt shaft, the swivel shaft swiveling the spindle head support.

5. A machine tool comprising the spindle unit according to claim 1, wherein the spindle unit is provided movably by at least one linear feed shaft in the vertical direction and horizontal direction.

6. A table unit having a tilt shaft for rotating and tilting a table so that a posture of the table changes, the table unit comprising:

a table base supporting the table to which a workpiece is attached;

a table base support having mutually separated first and second side walls, the table base support supporting the table base between the first and second side walls in a rotatable and tiltable manner;

first and second power transmission mechanisms provided along the first and second side walls of the table base support, respectively, the first and second power transmission mechanisms transmitting rotational drive power to the tilt shaft; and first and second drive source devices provided between the first and second side walls of the table base support, respectively, the first and second drive source devices outputting rotational drive power of the tilt shaft, wherein an output shaft of the first drive source device being arranged to face the first side wall and being connected to the first power transmission mechanism, wherein an output shaft of the second drive source device being arranged to face the second side wall and being connected to the second power transmission mechanism, and wherein the first and second drive source devices being arranged in parallel with the output shafts of the first and second drive source devices offset from each other.

7. The table unit according to claim 6, wherein the first and second power transmission mechanisms are arranged rotationally symmetric with each other at positions along the first and second side walls of the table base support.

8. The table unit according to claim 6, wherein the first and second power transmission mechanisms have taper gears attached to the output shafts of the first and second drive power devices so that smaller outside diameters are arranged in front end sides, respectively, wherein the second side wall of the table base support which a back end surface of the first drive source device faces has a hole of a size capable of passing the first drive source device in a state with the taper gear attached, and wherein the first side wall of the table base support which a back end surface of the second drive source device faces has a hole of a size capable of passing the second drive source device in a state with the taper gear attached.

9. The table unit according to claim 6, further comprising a swivel shaft differing from the tilt shaft, the swivel shaft swiveling the table base support.

10. The table unit according to claim 6, further comprising a swivel shaft differing from the tilt shaft, the swivel shaft swiveling the table with respect to the table base.

* * * * *